May 1, 1928.  1,668,190
F. J. CATTERLIN ET AL
HOBBYHORSE AND THE LIKE
Original Filed June 30, 1925
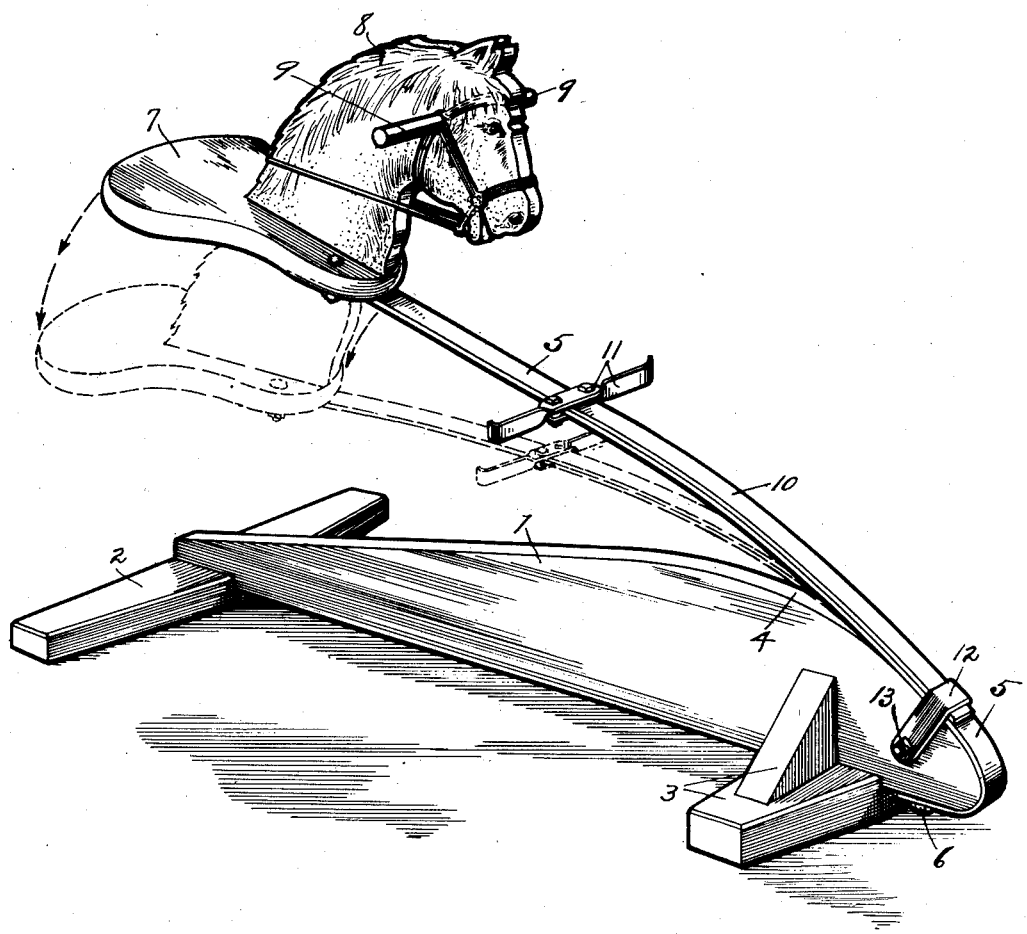

Patented May 1, 1928.

1,668,190

UNITED STATES PATENT OFFICE.

FRANCIS J. CATTERLIN, OF CHICAGO, ILLINOIS, AND EARL B. SPENCER, OF PASADENA, CALIFORNIA, ASSIGNORS, BY DIRECT AND MESNE ASSIGNMENTS, OF FIFTY-TWO ONE-HUNDREDTHS TO HARRY SCHECHTEL, TWENTY-NINE ONE-HUNDREDTHS TO BENJAMIN S. MESIROW, BOTH OF CHICAGO, ILLINOIS, AND NINETEEN ONE-HUNDREDTHS TO GEORGE B. GROSSMAN, OF HAMMOND, INDIANA.

HOBBYHORSE AND THE LIKE.

Application filed June 30, 1925, Serial No. 40,590. Renewed January 30, 1928.

Our invention relates to a device in the class of hobby horses or the like, especially designed for children and on which a child can sit and move up and down with a springing movement.

The principal object of our invention is to provide an improved and practical device of the character referred to which can be economically manufactured and sold at a reasonable price. We accomplish the object of our invention by providing a base member having a rounded bearing portion with a long spring member attached at one end and around said rounded bearing portion and extending tangentially therefrom so that when the upper end of said spring is moved downwardly, the body of said spring adjacent said rounded bearing portion bears upon and conforms thereto, thus shortening the functioning portion of the spring. Upon the outer end of said spring we place a seat, such, for example as a representation of a horse's head, with handles for the child to grip as he sits upon the seat.

Another object of this invention is to provide a hobby horse or the like which comprises a base and a steel spring attached at one end to the base in such a manner that the bending torque or shear of the spring is distributed over the length of the spring steel member and is not concentrated at a point.

Another object of this invention is to provide a hobby horse or the like of simple and inexpensive construction in which a base is provided and to which base a steel spring member is secured at one end in such a manner that the same extends upwardly therefrom, when not loaded, at an angle from the horizontal and which spring member is provided at its rear end with a seat which is directly over the base and near the rear end thereof, the length of the base and the spring being so proportioned as to eliminate the danger of the hobby horse upsetting, even though the base is not secured to the floor or the like.

Another object of this invention is to provide a hobby horse or the like of simple and inexpensive construction that comprises a base and a steel spring member so attached to the base at one end thereof that the portion of the spring member adjacent the end secured to the base member will be subjected to a bowing action extending over a portion of the length of the said spring and so that the said spring will not be subjected to a bending shearing torque at a single point.

In order to explain our invention, we have illustrated one practical embodiment thereof on the accompanying sheet of drawings, which we will now describe.

Figure 1 is a perspective view of a hobby horse embodying our invention.

Referring in detail to the drawings, the base member 1, is provided with the supports, 2 and 3, and with the rounded bearing edge portion, 4. A flat spring member, 5, is bent at its lower end around said rounded portion, 4, and secured in place by means of a bolt, 6, said spring member extending upwardly over the base member 1, and being provided with a seat, 7, in front of which, or as a part of which is the representation of a horse's head, 8, having the hand grips, 9, 9, for the child to grip while sitting upon the seat, 7. A second spring is shown, designated 10, which can be used for additional strength, as for a heavier child, and this is secured in place to the first spring by means of a combination foot rest and clamp, 11, positioned for the feet of the child on the seat. At its other end said spring 10 is held under a clevis 12, bolted at 13 to the base 1. This clevis also serves to hold the main spring 5 in place on the base as shown.

The base 1 is approximately of the same length as the spring 5. The seat 7 is secured to the upper end of the spring 5 at a point approximately over the support 2, so that on use of the toy, the same will not buck up and upset. This relation of lengths we have found to be particularly advantageous in that it enables the provision of the toy, the base of which need not be secured in position or to the floor or the like but permits the provision of a toy which is freely portable.

The spring 5 is secured to the base 1 in such a manner that the same extends upwardly therefrom and at an angle from the horizontal. This manner of securing the spring to the base greatly reduces the cost of construction and eliminates the necessity of providing a spring supporting standard. The spring 5 is also secured to the base in such a manner that the bending shearing torque incident to the riding of the toy is distributed throughout a portion of the length of the spring 5 and so that the bending torque is not concentrated at a point along the length of the said spring 5. The spring 5 bows throughout this portion of the length and provides spring means for the toy which are of long lasting qualities and are extremely easily and inexpensively constructed, requiring a minimum of parts and from a more serious standpoint provides a spring member which is not liable to crystallize and break when operated. This provision of a spring member which is not liable to crystallize and break during operation is a very important feature of this invention, in that it provides a safe toy which can be ridden by a child without danger of the spring breaking and permitting the child to fall. The toy is particularly adaptable for small children and if the spring is so attached that the same might break, the fall might prove serious.

While we have shown but one embodiment of our invention for descriptive purposes, we are aware that changes in details can be made therein without departing from the spirit thereof, and we do not, therefore limit the invention to the showing made, except as we may be limited by the hereto appended claims.

We claim:

1. A device of the character referred to comprising in combination a base member having a rounded portion on its upper side, a spring member attached at one end around said rounded portion and projecting upwardly in an inclined position with its free end provided with a seat, whereby a child can sit upon said seat and spring up and down on the free end of said spring.

2. A device of the character referred to comprising a base member having one end rounded and provided with supports to hold it in edgewise position, a flat spring member having one end attached to the end of said base adjacent said rounded portion and adapted to conform to said rounded portion of said base as said spring is sprung down at its free upper end, and a seat supported on said free upper end.

3. A device of the character referred to including in combination, a base, a flat spring member having its attached end bent around the end of said base and its free end projecting upwardly and rearwardly, a seat on the free end of said spring, a foot rest on said spring below said seat, and a reinforcing spring between the attached end of said spring and said foot rest, substantially as described.

4. In a device of the character referred to, the combination of a base member having a rounded upper edge, means for preventing it from tilting sidewise, a substantially straight spring steel member secured at one end to one end of said base in an inclined position and tangentially to said rounded upper edge, whereby the free end of said spring steel member extends upwardly and rearwardly over the rear end of said base, a seat on the upper free end of said spring steel member, said spring steel member being positioned to be flexed down upon and to conform to said rounded upper edge, whereby to distribute the bending torque of said spring member along its length to prevent crystallization thereof, and a foot rest on said spring member in front of said seat.

5. In a device of the character referred to, the combination of a base member having a rounded upper edge, means for preventing it from tilting sidewise, a flat spring steel member attached at one end to one end of said base, above said edge and inclined upwardly and rearwardly over the rearward part of said base, a seat on the upper free end of said spring member, a foot rest on said spring member in front of said seat, and a second flat spring member attached at one end with said first spring member to said base and extending flatwise along said first spring member for a part of its length, said flat spring members being adapted to be flexed downwardly together around said rounded upper edge of said base, subtantially as and for the specified purpose Signed at Los Angeles, Los Angeles County, California, this 24th day of June, 1925.

FRANCIS J. CATTERLIN.
EARL B. SPENCER.